(12) United States Patent
Cengarle et al.

(10) Patent No.: US 11,735,194 B2
(45) Date of Patent: Aug. 22, 2023

(54) AUDIO INPUT AND OUTPUT DEVICE WITH STREAMING CAPABILITIES

(71) Applicants: DOLBY LABORATORIES LICENSING CORPORATION, San Francisco, CA (US); DOLBY INTERNATIONAL AB, Amsterdam Zuidoost (NL)

(72) Inventors: Giulio Cengarle, Barcelona (ES); Antonio Mateos Sole, Barcelona (ES); Davide Scaini, Barcelona (ES); Suraj Suhas Barkale, North Sydney (AU)

(73) Assignees: DOLBY LABORATORIES LICENSING CORPORATION, San Francisco, CA (US); DOLBY INTERNATIONAL AB, Dublin (IE)

( * ) Notice: Subject to any disclaimer, the term of this patent is extended or adjusted under 35 U.S.C. 154(b) by 18 days.

(21) Appl. No.: 16/629,432

(22) PCT Filed: Jul. 12, 2018

(86) PCT No.: PCT/US2018/041874
§ 371 (c)(1),
(2) Date: Jan. 8, 2020

(87) PCT Pub. No.: WO2019/014477
PCT Pub. Date: Jan. 17, 2019

(65) Prior Publication Data
US 2020/0184983 A1    Jun. 11, 2020

Related U.S. Application Data

(60) Provisional application No. 62/558,456, filed on Sep. 14, 2017.

(30) Foreign Application Priority Data

Jul. 13, 2017   (ES) .................................... 201730933
Sep. 21, 2017   (EP) .................................... 17192421

(51) Int. Cl.
*H03G 5/00*      (2006.01)
*H03G 3/20*      (2006.01)
(Continued)

(52) U.S. Cl.
CPC .......... *G10L 19/167* (2013.01); *G10L 19/008* (2013.01)

(58) Field of Classification Search
CPC .... H03G 2201/103; H03G 3/20; H03G 7/007; H04R 2420/01; H04R 2430/01
(Continued)

(56) References Cited

U.S. PATENT DOCUMENTS 6,636,887 B1   10/2003   Augeri
7,297,858 B2   11/2007   Paepcke
(Continued)

FOREIGN PATENT DOCUMENTS

| CN | 103581306 | 2/2014 |
|---|---|---|
| CN | 103780670 | 5/2014 |
| CN | 204795576 | 11/2015 |

OTHER PUBLICATIONS

Reiss, Joshua D. "Intelligent Systems for Mixing Multichannel Audio" IEEE, Jul. 6-8, 2011.
(Continued)

*Primary Examiner* — George C Monikang

(57) ABSTRACT

Methods, systems, and computer program products that provide streaming capabilities to audio input and output devices are disclosed. An audio processing device connects an upstream device to a downstream device. The upstream device is plugged into an input port of the audio processing
(Continued)

device. The audio processing device intercepts a signal from the upstream device to the downstream device. The audio processing device converts the signal to digital data and streams the digital data to a server. The digital data can include metadata, e.g., an input gain. The audio processing device can adjust the input gain in response to instructions from the server. The audio processing device feeds a pass-through copy of the audio signal to an output port. A user can connect the downstream device in a usual signal chain into the output port of the audio processing device. The streaming does not affect the user's workflow.

12 Claims, 9 Drawing Sheets

(51) Int. Cl.
*H04S 3/02* (2006.01)
*G10L 19/16* (2013.01)
*G10L 19/008* (2013.01)

(58) Field of Classification Search
USPC .............................. 381/104, 107, 119, 22, 23
See application file for complete search history.

(56) References Cited

U.S. PATENT DOCUMENTS

| | | | |
|---|---|---|---|
| 8,301,076 B2 | 10/2012 | Grandinetti | |
| 9,106,790 B2 | 8/2015 | Bicker | |
| 9,305,531 B2 | 4/2016 | Miwa | |
| 2008/0226101 A1* | 9/2008 | Silber | H04B 1/207 381/123 |
| 2009/0113022 A1 | 4/2009 | Quoc | |
| 2011/0075851 A1 | 3/2011 | Leboeuf | |
| 2012/0077466 A1* | 3/2012 | O'Mahony | H04N 21/631 455/566 |
| 2012/0174738 A1 | 7/2012 | Kim | |
| 2014/0096667 A1 | 4/2014 | Chapman | |
| 2016/0266867 A1 | 9/2016 | Olesh | |
| 2019/0242949 A1* | 8/2019 | Lemkin | H01M 10/42 |

OTHER PUBLICATIONS

Alexandraki, C. et al "Exploring New Perspectives in Network Music Performance: The DIAMOUSES framework" IEEE, Music Journal Jun. 1, 2010, p. 66-83.

Sigismondi, G. et al "Microphone Techniques for Recording", retrieved from the Internet: Aug. 12, 2014, pp. 1-40.

* cited by examiner

AUDIO INPUT AND OUTPUT DEVICE WITH STREAMING CAPABILITIES

CROSS REFERENCE TO RELATED APPLICATIONS

This application claims priority to Spanish Patent Application No. P201730933, filed on Jul. 13, 2017, U.S. Provisional Patent Application No. 62/558,456, filed on Sep. 14, 2017, and European Patent Application No. 17192421.0 filed on Sep. 21, 2017, the disclosures all of which are incorporated herein by reference in their entirety.

TECHNICAL FIELD

This disclosure relates generally to audio signal processing.

BACKGROUND

In conventional audio recording of a live performance, recording audio signals requires physical connection of sound sources, e.g., instruments and microphones, to a recording device. The physical connection can be through cables and connectors, or wireless transmitters and receivers. A recording engineer can use the cloud or a local server to perform computationally expensive high-quality mixing of the performance. In such applications, all signals need to be brought from recording devices to the cloud or local server in a manner that has the least possible impact on performers' workflows. In conventional audio signal processing, computerized mixing is best achieved in post-production, e.g., when the recording is done. The computationally expensive mixing operations can be performed on already recorded signals to avoid interference with performers.

SUMMARY

Techniques that provide streaming capabilities to audio input and output devices are disclosed. An audio processing device connects an upstream device, e.g., a microphone or a musician's instrument, to a downstream device, e.g., an amplifier or a recording device. The upstream device is plugged into an input port of the audio processing device. The audio processing device intercepts a signal from the upstream device to the downstream device. The audio processing device converts the signal to digital data, connects to a wireless access point or uses its built-in mobile communication capability (e.g., LTE), and streams the digital data to a server. The digital data can include digitally encoded audio signal and metadata, e.g., an input gain. The audio processing device can adjust the input gain of its Analog-to-Digital (A/D) converter in response to instructions from the server. The audio processing device has an output port. The audio processing device feeds a pass-through copy of the audio signal to the output port. A user can connect the downstream device in a usual signal chain into the output port of the audio processing device. The streaming does not affect the user's conventional workflow.

The features described in this specification can achieve one or more advantages over conventional audio and video processing technology. The features improve upon conventional manual audio and video capture and processing technology by reducing complexity of a recording setting. Streaming audio to a server using conventional technology may be cumbersome and often expensive, requiring using existing devices not designed for this purpose. The disclosed techniques can use a simple, integrated, and dedicated audio processing device to perform up-streaming.

The disclosed techniques allow a server to provide feedback and control during recording, thus avoiding or reducing human intervention and human errors introduced into a recording chain by conventional techniques. The feedback and control can occur during live recording, instead of post-production, thus signal quality can be ensured from the beginning. The live feedback and control at the beginning of the signal chain are advantageous over conventional techniques, where errors or imperfections can be introduced into the original recording and are removed or corrected later during mixing time. The disclosed techniques allow captured signals to be streamed directly to the cloud, or to local servers, in a way that minimally impacts musicians. The advantages are even more apparent when multiple such devices are used, as the disclosed techniques allow the server to provide smarter decisions which are based on a global analysis of the performance, by considering all the AV data essence, as well as metadata, arriving from all such devices.

The disclosed techniques can offer novel possibilities to the musicians. The audio processing devices can be configured to receive and implement commands from a server, e.g., the cloud or from a local server. The server may receive streams from other audio processing devices connected to instruments or microphones in the same performance. Accordingly, the server can provide "smart" and "high-level" commands to each individual device to coordinate the recording.

The disclosed techniques can bring studio-quality recording to consumers. In a studio setting, a human sound engineer may adjust signal levels received by a mixer from microphones. The disclosed techniques can automatically adjust the gains at the microphones, which are more upstream in the signal path than the mixer. Accordingly, a computing device, e.g., a smartphone, can act like a professional mixing studio and may produce audio recording with studio-quality sound without using expensive professional equipment.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Example Recording Setup

Figure 1:
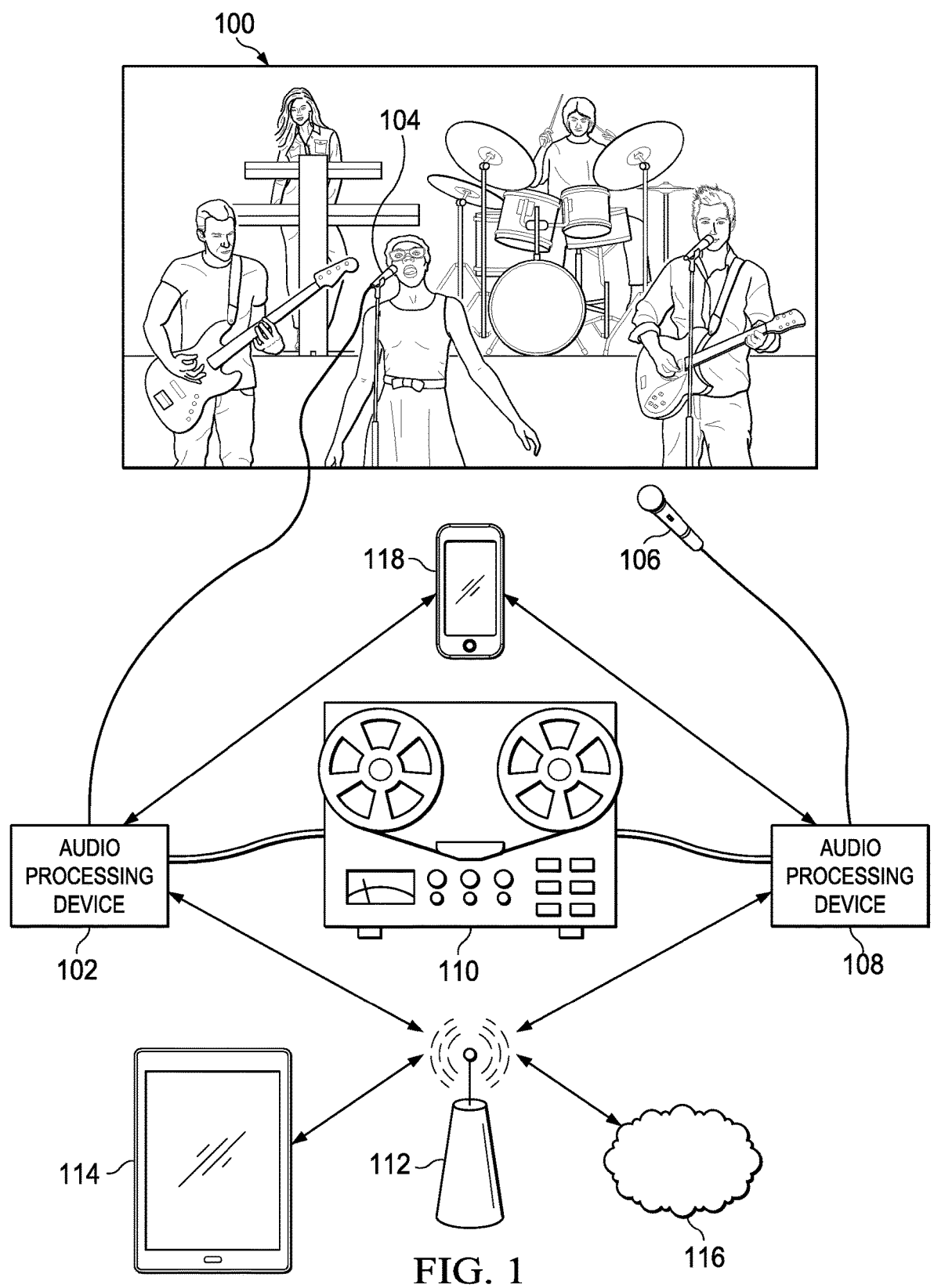
FIG. 1 is a diagram illustrating a recording session where an audio processing device streams digital data of a live performance event to a server.

FIG. 1 is a diagram illustrating a recording session where an audio processing device streams digital data of a live performance event to a server. An event 100 can be any event where audio content (e.g., speech, vocal music or instrumental music) is produced. In particular, the event 100 can be a live performance event, e.g., a concert, in which one or more musical instruments and/or one or more vocalists perform. One or more sound sources can be present at the event 100. Each sound source can be an instrument, a vocalist, a loudspeaker, a laptop, or any item that produces sound. For convenience, sound sources, including non-instrument sound sources, are collectively referred to as instruments in various portions of this specification.

In the example shown, microphones 104 and 106 are configured to capture audio signals from the instruments in the event 100. Each of the microphones 104 and 106 is connected to a respective audio processing device, e.g., the audio processing device 102 and another audio processing device 108, respectively. The microphones 104 and 106 are designated as upstream devices relative to the audio processing device 102 and the audio processing device 108. Upstream devices provide audio signal to the audio processing device 102 and the audio processing device 108. In various implementations, upstream devices are not limited to microphones. For example, an upstream device can be an instrument, e.g., a sound synthesizer or an electronic guitar with an audio signal output, or an audio device, e.g., a digital music player or a computer. The audio signal can be an analog signal or a digital signal. An upstream device may be plugged into an input port of the audio processing device 102 or the audio processing device 108.

In some implementations, each of the audio processing device 102 and the audio processing device 108 includes a respective built-in internal microphone. A user, e.g., a musician or a recording engineer, can place the audio processing device 102 and the audio processing device 108 at respective locations for desired acoustic effects.

The outputs of the audio processing device 102 and the audio processing device 108 can be plugged into a downstream device 110, e.g., a conventional sound system or console. The outputs of the audio processing device 102 and the audio processing device 108 can include pass-through audio signals. In the example shown, the outputs are fed into a recording device.

Being placed in signal paths between the upstream devices and the downstream device 110, each of the audio processing device 102 and the audio processing device 108 intercepts respective audio signals. The audio processing device 102 and the audio processing device 108 can encode the audio signals into digital data. The audio processing device 102 and the audio processing device 108 can incorporate various information, including, for example, respective recording settings, respective input gain levels, respective device information, into the digital data. Accordingly, the digital data can include digitally encoded audio signals and metadata.

The audio processing device 102 and the audio processing device 108 can connect to a wireless gateway 112, e.g., a wireless access point or a cellular tower. The audio processing device 102 and the audio processing device 108 can provide, e.g., stream, the digital data to a local server 114, e.g., a mobile device or a tablet, laptop or desktop computer. The audio processing device 102 and the audio processing device 108 can provide the digital data to a remote server, e.g., to a service provided by a cloud-based computing platform 116.

The server can provide instructions to adjust various parameters of the audio processing device 102 and the audio processing device 108. For example, the server can analyze the streamed digital data and determine that, compared to the digitally encoded audio signals from the audio processing device 108, the digitally encoded audio signals from the audio processing device 102 has an input gain that is too high or too low for achieving a particular pre-specified sound effect. The server can send instructions to the audio processing device 102 to decrease or increase the input gain. In response, the audio processing device 102 can decrease or increase the input gain without human intervention. The pre-specified sound effect can include, for example, balanced input level between microphones that have different types and acoustic characteristics, an emphasis on a particular microphone, e.g., one that is associated with a lead vocalist, or de-emphasis on a particular microphone that has to be placed closer to the instruments than other microphones.

The audio processing device 102 and the audio processing device 108 can be set up in various ways. For example, the audio processing device 102 and the audio processing device 108 can be configured through an application program on a smartphone 118 through a wireless connection, e.g., a connection through a personal area network (PAN) using Bluetooth™ technology. The audio processing device 102 and the audio processing device 108 can be configured by a Web browser through the local server 114 or the cloud-based computing platform 116. A user of the smartphone 118 or the Web browser to enter settings for a recording session, e.g., session name, number of channels, a server address, e.g., Internet protocol (IP) address to connect to, or any combination of the above. The smartphone 118 can connect to various network devices or services, including the local server 114 and the cloud-based computing platform 116, through the wireless gateway 112.

In some implementations, at least some parameters of the audio processing device 102 and the audio processing device 108 can be set up by a controller. The controller can share control information, e.g., session settings, master clock, device information, with each audio processing device connected to the controller. The controller can be implemented on anyone of the audio processing device 102, the audio processing device 108, the local server 114, the cloud-based computing platform 116, or the smartphone 118.

In some implementations, the controller can register the audio processing device 102 and the audio processing device 108 through fully automatic discovery and configuration. A user may register one or more of the audio processing devices 102 and the audio processing device 108 using the controller, e.g., by assigning the audio processing devices 102 and the audio processing device 108 to a particular group. The registered devices are discovered and configured automatically when a new recording session starts.

Figure 2:
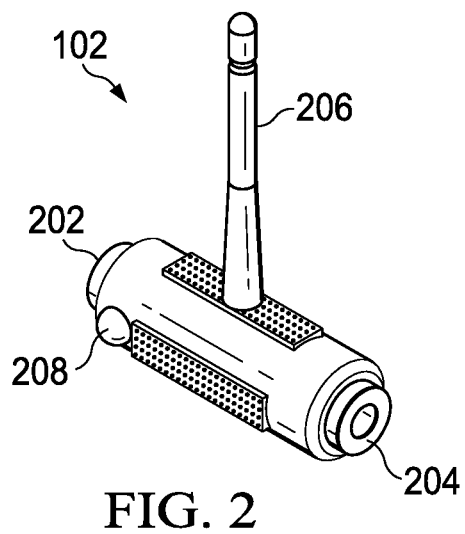
FIG. 2 is a diagram illustrating an example audio processing device.

FIG. 2 is a diagram illustrating an example audio processing device 102. The audio processing device 108 of FIG. 1 can have a similar structure. The audio processing device 102 can include one or more computer processors.

The audio processing device 102 includes an input port 202 for receiving an input audio signal from an upstream device. For example, the input port 202 can include a microphone input with a female XLR connector and phantom power. The input port 202 can include an instrument input with a female jack connector. The input port 202 can include a line input with female jack or XLR connector. For clarity and convenience, only one input port 202 is shown. In various implementations, the audio processing device 102 can include multiple input ports. For example, the audio processing device 102 can include two input ports, each for a respective channel for stereo audio. Likewise, the audio processing device 102 can have input ports for multi-channel audio.

The audio processing device 102 includes an output port 204 for providing a pass through copy of the input audio signal as an output signal to a downstream device. For clarity and convenience, only one output port 204 is shown. In various implementations, the audio processing device 102 can include multiple output ports. For example, the audio processing device 102 can include two output ports, each for a respective channel for stereo audio. Likewise, the audio processing device 102 can have multiple output ports for multi-channel audio or for providing different output routing options.

The audio processing device 102 includes an analog or digital pass through for each of the inputs. The audio processing device 102 includes an encoder, e.g., an analog/digital (A/D) converter, that converts an analog input audio signal into digital data. The audio processing device 102 includes a communication device for streaming the digital data, as well as values of one or more input gains to a configurable server. The communication can include a Wi-Fi device having an antenna 206 for communicating with a wireless gateway wirelessly.

The audio processing device 102 can optionally include one or more feedback devices, e.g., a light-emitting diode (LED) 208. The LED 208 can provide various feedbacks, e.g., audio clipping or low battery level warning, to a user. Additional details on the feedbacks are disclosed below in reference to FIG. 3.

Figure 3:
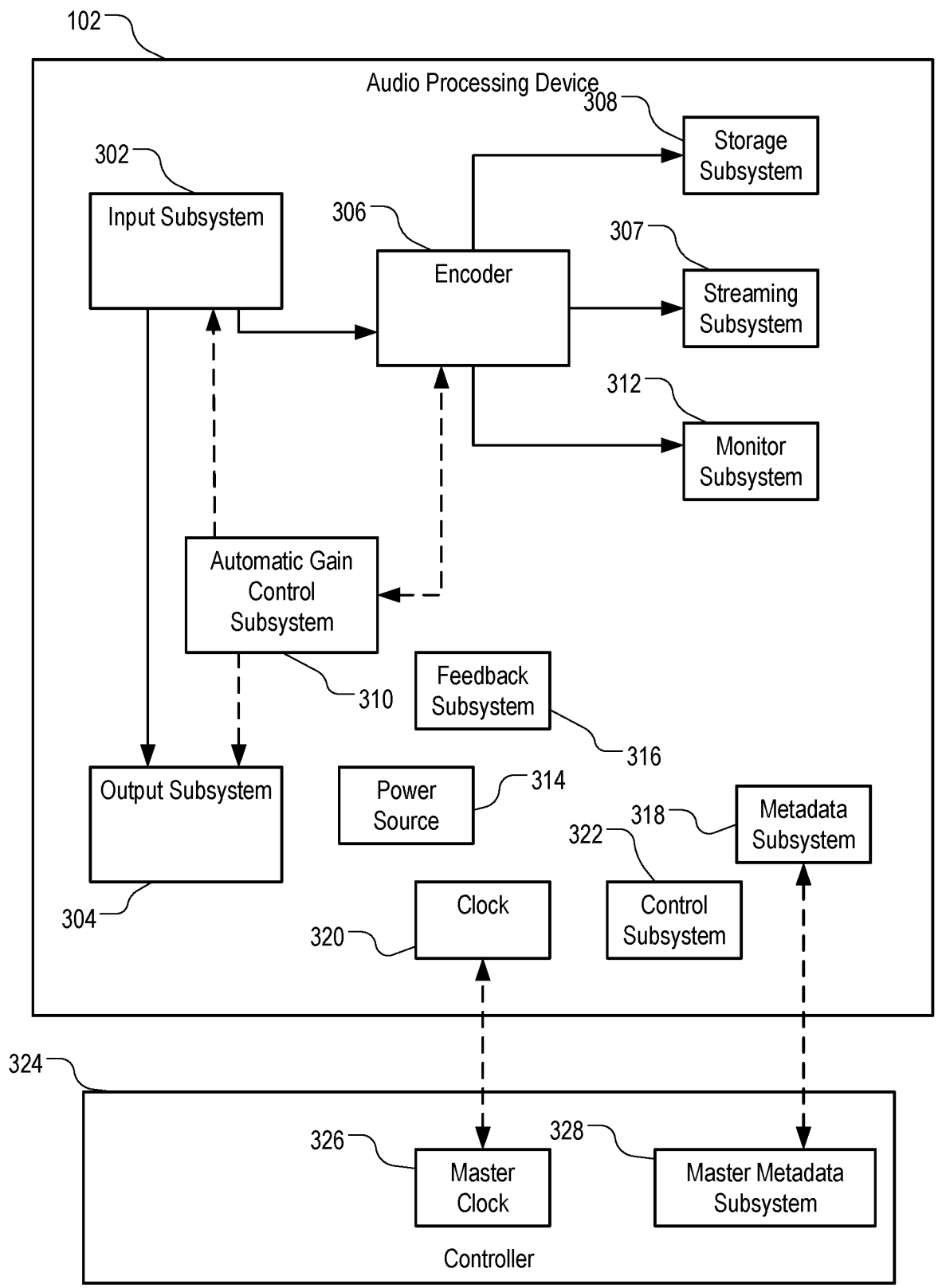
FIG. 3 is a block diagram illustrating architecture of an example audio processing device.

FIG. 3 is a block diagram illustrating architecture of an example audio processing device 102. The audio processing device 108 of FIG. 1 can have a similar architecture. In FIG. 3, audio signal paths are shown in arrows with solid lines. Control signal paths are shown in arrows with dashed lines. The audio processing device 102 includes multiple subsystems. Each subsystem can include hardware, hardware and software, or hardware and firmware components.

The audio processing device 102 includes one or more input subsystems 302. An input subsystem 302 can include an input port 202 described in reference to FIG. 2. An input subsystem 302 can include a built-in microphone. An input subsystem 302 can include a universal serial bus (USB) input port for connecting to a USB microphone or a sound card. An input subsystem 302 can include a combined microphone, line and instrument input with a combined XLR and jack connector or separate connector. An input subsystem 302 can include a mono, stereo, or multi-channel version of various combinations of the above.

The audio processing device 102 includes one or more output subsystems 304. An output subsystem 304 can include an output port 204 described in reference to FIG. 2.

An output subsystem 304 can include a mono, stereo, or multi-channel version, corresponding to the input channels. An output subsystem 304 can provide analog pass through for each input channel. The pass through can be hardwired. The output subsystem 304 can provide line level analog output if input audio signals have gone through a microphone preamplifier or instrument preamplifier. In some implementations, an output subsystem 304 can include a headphone jack for analog headphone output. In some implementations, an output subsystem 304 can include a wireless output, e.g., a Bluetooth output for a wireless speaker, wireless headphone, or wireless audio recorder.

The audio processing device 102 includes an encoder 306. The encoder 306 is a device configured to perform analog to digital (A/D) conversion to convert analog input audio signal to digitally encoded audio signals of a specified format. For example, the encoder can include a 24-bit A/D converter. The encoder 306 can provide the digitally encoded audio signals to various devices.

In some implementations, the encoder 306 can add metadata to the digitally encoded audio signals to create digital data. The encoder 306 can provide the digital data to a storage subsystem 308. The storage subsystem 308 can include a non-transitory storage medium, e.g., a micro storage card, that can store the digital data as one or more digital files. The encoder 306 can provide the digital data to a streaming subsystem 307. The streaming subsystem 307 can include a device, e.g., a wireless transceiver, that is configured to submit the digital data to a remote device, e.g., a server. The transceiver has an external or internal antenna, e.g., the antenna 206 of FIG. 2, for transmitting the digital data.

In some implementations, an input subsystem 302 can receive digital input audio signals, e.g. those coming from a laptop via a USB connection. The encoder 306 is then configured either in by-pass mode, or to perform digital-to-digital conversion to a specified format.

Regardless of whether the input signals are analog or digital, the encoder 306 can encode the digital signals using lossy codes. Such encoding can reduce bitrate of the input audio signal. The streaming subsystem 307 can stream the digitally encoded audio data with reduced bitrate to the server.

In some implementations, an input subsystem 302 can have multiple parallel input stages with different gains. For example, the input subsystem 302 can have a high gain path and a low gain path to the encoder 306. The input subsystem 302 provides a high gain signal to the encoder 306 through the high gain path. The input subsystem 302 provides a low gain signal to the encoder 306 through the low gain path. The encoder 306 encodes the high gain signal and the low gain signal separately. The encoded audio signals are streamed to the server separately. The server can obtain a proper signal level by combining inputs at different gains.

In some implementations, the audio processing device 102 has multiple input subsystems 302, each corresponding to a respective input source, e.g., a left channel microphone and a right channel microphone. The encoder 306 can encode input audio signals from each input source separately, or perform joint lossy codec optimization. The encoder 306 can exploit correlation and similarity between the input audio signals to encode the input audio signals more efficiently, for example, by using various Dolby™ AC-4 algorithms.

The audio processing device 102 includes a power source 314. The power source 314 includes a device that supplies power to various components of the audio processing device 102. The power source 314 can be configured to supply phantom power to one or more input subsystems 302, for example, to power a microphone. The power source 314 can include one or more batteries or one or more power jacks for plugging a power adaptor. In some implementations, the power source 314 can be powered from external phantom power by a next device in a device chain, similar to ways where active DI (direct input) units receive power from a console. The power source 314 can include a power port, e.g., a micro USB connector or similar connecter, that allows the audio processing device 102 to be charged The audio processing device 102 includes a gain control subsystem 310. The gain control subsystem 310 is a device configured to control a gain of the analog input according to instructions provided by a server. The gain control subsystem 310 is configured to submit the gain, e.g., plus three dB, applied to the input audio signals to the server as metadata. The gain control subsystem 310 is configured to receive the instructions from the server for adjusting the gain, for example, minus five decibels (dBs) from the current level. Accordingly, the gain control subsystem 310 can operate as a smart device that takes the whole band into account to make decisions for each device. The gain control subsystem 310 can communicate input gain changes to the server, to allow the server to take the changes into account. The adjusted input gain can cause both the level of the pass through signal at the output subsystem 304 and the level of digitalized audio signals from the encoder 306 to change accordingly. In some implementations, the gain control subsystem 310 adjusts the level of the digital data output of the encoder 306. The gain control subsystem 310 can leave the pass-through signal unchanged. In such implementations, the audio processing device 102 maintains good quality of streamed digital data while not affecting the level of instruments in the audio event.

The audio processing device 102 includes a monitor subsystem 312. The monitor device can include a device that receives encoded digital data from the encoder 306 and provides an output, e.g., a headphone output or a meter output that presents the digital data. The monitor subsystem 312 can be coupled to the gain control subsystem 310 in such a way that adjusting the gain by the gain control subsystem 310 will affect the output of the monitor subsystem 312, directly or through modified levels of the audio signals fed to the encoder 306. The monitor subsystem 312 can be configured to provide feedback to the gain control subsystem 310 to increase or decrease the gain on the input audio signals. In the scenario where the audio processing device 102 and other audio processing devices are connected to a server, the monitoring output of each device can be controlled by a monitoring logic that allows monitoring the whole mix, or any desired combination of available signals e.g. a mix with more drums, only one instrument, etc. The monitor subsystem 312 can provide a wireless output, e.g., a Bluetooth output, to one or more remote monitors.

The audio processing device 102 includes one or more feedback subsystems 316. A feedback subsystem 316 includes a device configured to provide various pieces of information to user such as a performer or a recording engineer. A feedback subsystem 316 can be an integrated device, e.g., the LED 208 and display screen 210 of FIG. 2, or a remote feedback device, e.g., a display screen of a smartphone wirelessly connected to the audio processing device 102. The feedback subsystem 316 can indicate, for example, whether a wireless connection to a wireless gateway or to a server is established, a state of the wireless connection (e.g., optimal, faulty, low bandwidth), whether clipping occurred, whether input gain is increased or decreased, a battery level, a signal level, a recording status, e.g., started, stopped, or paused.

The feedback subsystem 316 can indicate a discovery mode that allows the audio processing device to identify itself in response to a remote input. A light emitter such as an LED can act as a discovery indicator. When multiple audio processing devices operate simultaneously in a same recording session, a server can identify the audio processing device 102 from multiple audio processing devices as having an input level that is improper for the mix. In response, the server can automatically select audio processing device 102. The server then provides a discovery signal to the audio processing device 102 that requests the audio processing device 102 to identify itself.

In response to the discovery signal, the audio processing device 102 can provide an output on the feedback subsystem 316 to identify itself. For example, an LED can quickly distinguish between devices to allow a performer or audio engineer to know which one should be moved closer to or away from a particular instrument to get a better capture. In some implementations, a user can select, in a user interface presented on a server, a particular audio processing device, e.g., the audio processing device 102, from a list of devices. The server can send a discovery signal to the selected device. In response to the discovery signal, the discovery indicator can blink to indicate that this device is the selected device. Likewise, a process executing on the server may indicate to users that a particular audio processing device needs attention for various reasons. The process may send a "blink" instruction to that device. In response to the instruction, the discovery indicator can blink.

The audio processing device 102 includes a metadata subsystem 318. The metadata subsystem 318 can include a device for collecting or generating recording metadata and a storage device for storing the metadata. The metadata can include a device model specifying what type of device the audio processing device 102 is, firmware version, relevant characteristics of that model and that version. The characteristics can include, for example, type of input such as mono, stereo, directivity patterns. The characteristics can include a pose, e.g., position, orientation, and geographic location detected by a sensor, e.g., a global navigation satellite system (GNSS) receiver onboard the audio processing device 102 or otherwise coupled to (e.g., wirelessly connected to or plugged into) the audio processing device 102. The characteristics can include a battery level, display size and display setting, e.g., whether the display is turned off. The metadata subsystem 318 can submit the metadata to a server, e.g., through the streaming subsystem 307. The server can implement various processes using the metadata as parameters. For example, based on the metadata, the server can compensate lack of high frequency response in a microphone. The server can determine when to communicate with the audio processing device 102 to cause the audio processing device 102 to present various information by operating a certain LED or display screen.

In some implementations, the audio processing device 102 includes a clock 320. The clock 320 is a component of the audio processing device 102 that is configured to generate one or more time signals. The audio processing device 102 can incorporate the time signals into the digital data generated by the encoder 306 from audio signals. The time signals can be in the form of timestamps or other form of time code. The timestamps and time code can facilitate subsequent synchronization of streams from multiple devices.

In some implementations, the audio processing device 102 includes a control subsystem 322. The control subsystem 322 is a component of the audio processing device 102 configured to receive inputs from one or more hardware control devices, e.g., buttons, dials, slides, switches, motion sensors for detecting gestures, remote controllers, or various combinations of the above, to change basic functions of the audio processing device 102, including, for example, start streaming, stop streaming, change phantom power settings, or change gains, among others. The control subsystem 322 can be configured to receive wireless signals that controls the functions. The wireless signals can be provided by an application executing on a mobile device, e.g., a smartphone. The wireless signals can be provided by a server. In response, the control subsystem 322 can setup connections between the audio processing device 102 and the server.

In some implementations, the audio processing device 102 is controlled by a controller 324. The controller 324 can be a device implemented into a same hardware body as the audio processing device 102, or implemented as a separate hardware device, or implemented on existing separate devices, e.g., on a mobile device or on a server, running controller software. The controller 324 can control various aspects of the operations of the audio processing device 102 as well as other audio processing devices in a recording session. For example, the controller 324 can include a master clock 326 that communicates with the clock 320 of the audio processing device 102 and clocks of other audio processing devices such that the timestamps in streamed digital audio are synchronized among devices for mixing. The controller 324 can include a master metadata subsystem 328 that communicates with the metadata subsystem 318 of the audio processing device 102 and metadata subsystems of other audio processing devices to share common information, e.g., session name, recording title, band name, song name, battery level, etc.

Figure 4:
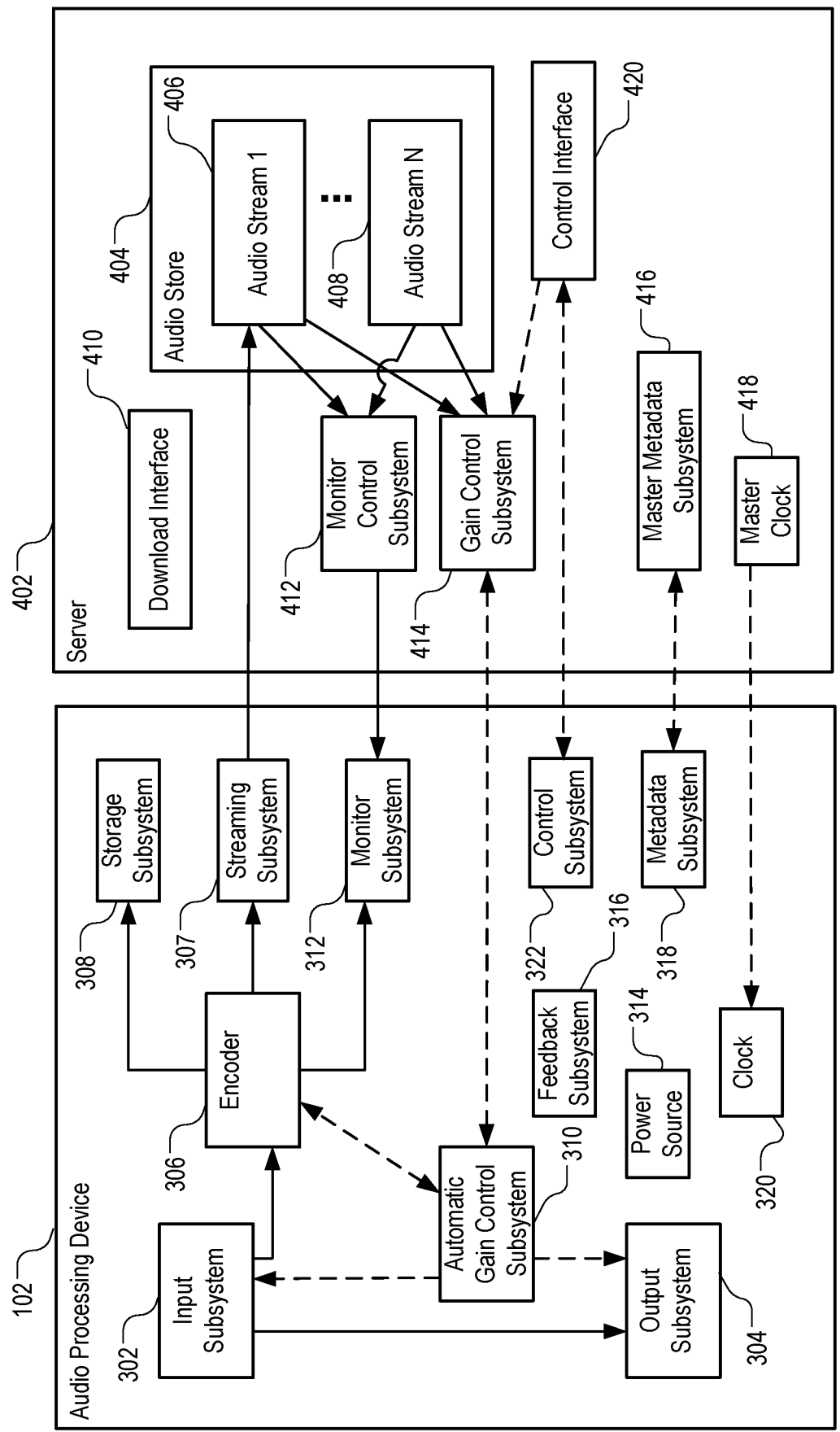
FIG. 4 is a block diagram illustrating architecture of an example audio processing device in a networked environment.

FIG. 4 is a block diagram illustrating architecture of an example audio processing device 102 in a networked environment. In the networked environment, the audio processing device 102 is connected to a server 402. The server 402 can be a computing device, e.g., a smartphone, a tablet, laptop or desktop computer, or a dedicated digital audio device. The server 402 can be implemented as a service provided by a cloud computing platform where one or more computers collectively server the audio processing device 102. For example, the server 402 can be the local server 114 or cloud-based computing platform 116 of FIG. 1. The audio processing device 102 can be connected to the server 402 through a wired or wired communications network.

A streaming subsystem 307 of the audio processing device 102 can provide digital data to an audio store 404 of the server 402. The streaming subsystem 307 can provide the digital data by streaming the data to the audio store through a network connection. The digital data can include metadata and digitally encoded audio signals.

In some implementations, the audio store 404 can include a non-transitory storage device that stores the digital data. The audio store 404 stores the encoded audio signals as a first audio stream 406. The audio store 404 can store encoded audio signals from other audio processing devices as other audio streams. For example, multiple (N) audio processing devices can be configured to operate in a recording session. The audio store 404 can store encoded audio signals from an N-th audio processing device as the N-th audio stream 408. A client device, e.g., a streaming player, that connects to the server 402 can download the audio stream 406 and the audio stream 408 through a download interface 410.

In some implementations, the audio store 404 provides a real-time streaming service. The real-time streaming service allows the encoded audio signals from the audio processing device 102 and other audio processing device to be streamed to one or more audio playing devices, e.g., streaming players while the recording session is in progress.

The server 402 includes a monitor control subsystem 412. The monitor control subsystem 412 can provide logic that combines multiple audio streams, e.g., the audio stream 406 and the audio stream 408, and provide the combined audio streams to a monitor subsystem 312 of the audio processing device 102. Accordingly, for example, a performer monitoring performance through the audio processing device 102 can hear not only the performer's own instrument, but also other instruments in the performance, for example, a selected section of a band or the mix of the entire band.

The server 402 includes a gain control subsystem 414. The gain control subsystem 414 is a component of the server 402 configured to determine a gain level for the audio processing device 102 based on multiple factors including metadata received and a combination of the audio stream 406 and the audio stream 408. The gain control subsystem 414 can determine to increase or decrease a current gain of the audio processing device 102 by balancing gains of the audio stream 406 and the audio stream 408. In addition, the gain control subsystem 414 can determine to increase or decrease the current gain based on a value of the current gain provided by a gain control subsystem 310 of the audio processing device 102 as metadata.

For example, the gain control subsystem 310 can indicate that the audio processing device 102 is already operating at maximum gain, or at a gain level that causes distortion level that exceeds a threshold. In response, the gain control subsystem 414 can instruct other audio processing devices to decrease gains rather than instructing the audio processing device 102 to increase gain. The gain control subsystem 414 can instruct the gain control subsystem 310 or other gain control subsystems to adjust the gain level in real time, while the performance is being recorded.

The server 402 includes a master metadata subsystem 416. The master metadata subsystem 416 is a component of the server 402 configured to receive information, e.g., session name, recording title, band name, song name, battery level, etc., from a metadata subsystem 318 from the audio processing device 102. The master metadata subsystem 416 can share that information among multiple audio processing devices connected to the server 402.

The server 402 can include a master clock 418 that communicates with the clock 320 of the audio processing device 102 and clocks of other audio processing devices such that the timestamps in streamed digital audio are synchronized among devices for mixing. The server 402 can include control interface 420 that communicates with the control subsystem 322 of the audio processing device. The control interface 420 can allow a user to use a user interface to control various functions of the audio processing device 102, or allow server logic to control the functions. The functions can include those described above in reference to the control subsystem 322.

Example Processes

Figure 5:
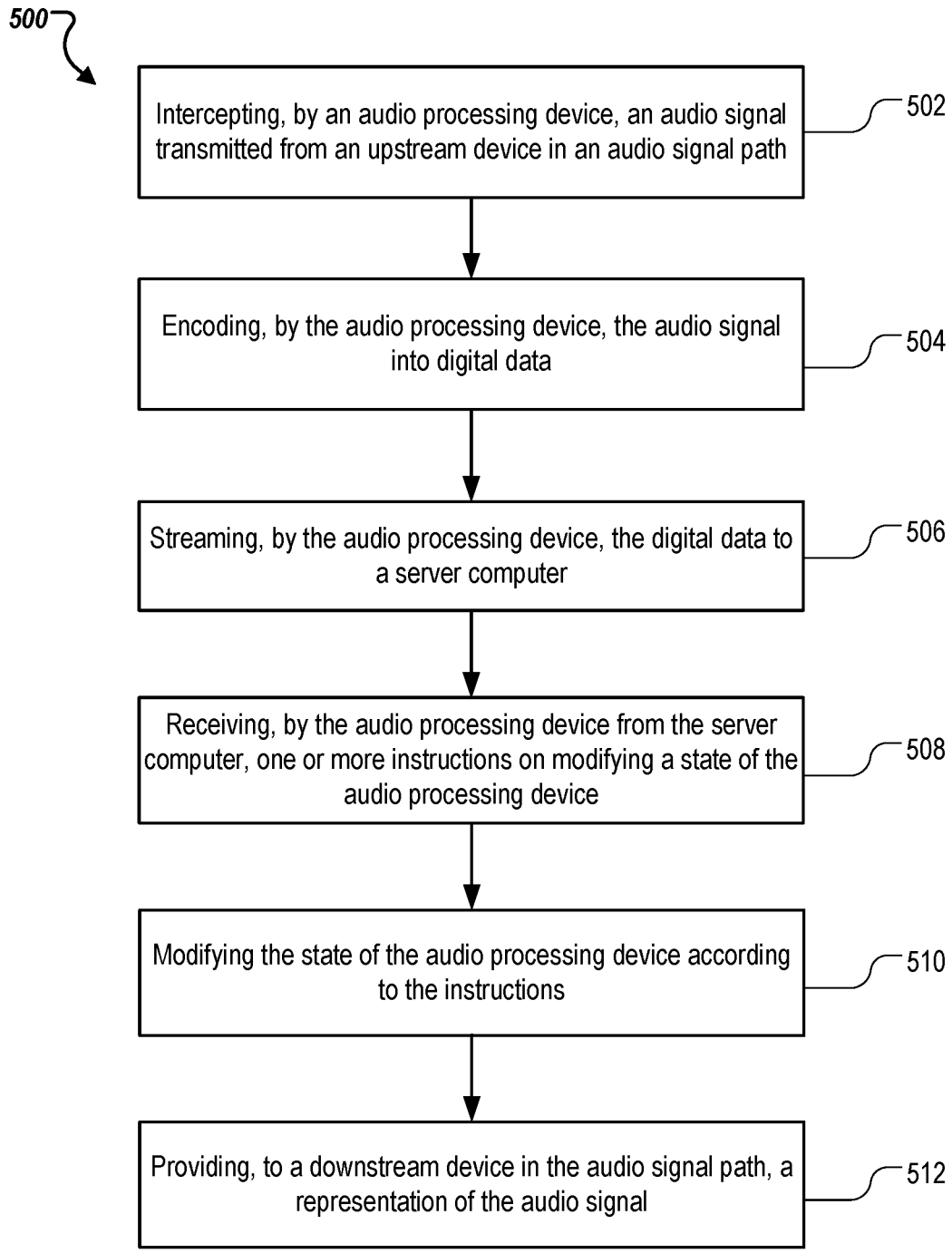
FIG. 5 is a flowchart of an example process of streaming performed by an audio processing device.

FIG. 5 is a flowchart of an example process of streaming performed by an audio processing device. The audio processing device can have various types, e.g., a dongle, a pass through connector, a DI unit, or a mobile device such as a smart phone. The audio processing device includes one or more computer processors. An example audio processing device is the audio processing device 102 as disclosed above.

The audio processing device intercepts (502) an audio signal transmitted from an upstream device in an audio signal path. The upstream device can include a microphone or an instrument wired to the audio processing device. The instrument can be, for example, a sound synthesizer, an electronic instrument, or an output device from an audio system. The audio signal can be an analog signal or a digital audio signal, for example, one that can be compressed to lower bitrate.

The audio processing device encodes (504) the audio signal into digital data. Encoding the audio signal into digital data can include performing joint lossy codec optimization on a plurality of channels of the audio signal. The audio processing device encodes can include device information in the digital data. The device information can include, for example, a memory amount indicating amount of memory available for recording, a battery status, device type metadata indicating attributes of the audio processing device, or any combination of the above. The audio signal can include a digital audio signal. In such cased, encoding the digital audio signal into digital data is performed using a lossy encoding scheme.

The audio processing device streams (506) the digital data to a server that includes one or more computers. Streaming the digital data can be live streaming, while the audio signal is being received by the audio processing device. The audio processing device can be one of multiple audio processing devices. Each of the audio processing devices is registered at the server computer for a particular recording session. The registration can be facilitated by a mobile device, e.g., a smartphone. The server computer can be a mobile device, a tablet device, a laptop computer, a desktop computer, or one or more computers in a cloud computing environment.

The audio processing device receives (508), from the server computer, one or more instructions on modifying a state of the audio processing device. Modifying the state can include adjusting an aspect of the audio signal. The aspect of the audio signal can be a signal gain for an input subsystem or an encoder of the audio processing device. The server can select the audio processing device from multiple audio processing devices connected to the server computer for a recording session. The selection can be a user selection through a user interface. The server computer can provide instructions to the audio processing device indicating that the audio processing device is selected. The audio processing device can provide feedback information for display on the audio processing device, indicating that the audio processing device is designated as a selected device at the server computer.

The audio processing device modifies (510) the state of the audio processing device according to the one or more instructions. Modifying the state can include adjusting the aspect of the audio signal. For example, the audio processing device can increase or decrease a signal gain. The signal gain can include a gain of a digital encoder of the audio processing device, a post-encoding digital gain after the audio signal has been encoded by the digital encoder, or both. The adjustment can affect, directly or indirectly, a pass though audio signal that is part of the output of the audio processing device. The adjustment occurs during live recording.

The audio processing device provides (512), to a downstream device in the audio signal path, a representation of the audio signal. The representation of the audio signal can include at least one of a pass though of the audio signal or, upon determining that the instruction includes an instruction to adjust an aspect of the audio signal, an adjusted audio signal. In some implementations, the audio processing device can output both. The pass through can be a copy of the audio signal unchanged from the input, notwithstanding unintentional distortions that might have been caused by various components of the audio processing device. The downstream device can include, for example, an audio recorder or an amplifier. Accordingly, inserting the audio processing device in the audio signal path does not affect other aspects of the workflow of recording or amplifying a performance event.

In some implementations, the audio processing device receives streamed audio signals from the server computer. The streamed audio signals include a representation of the digital data provided by the server computer. The streamed audio signals can include a mix of the representation of the digital data and digital data submitted to the server computer by another audio processing device. For example, the server computer can mix a vocalist's sound with the sound of a drummer, and stream the mixed audio signals to the audio processing device. The audio processing device can provide the streamed audio signals to a monitor device, e.g., a headphone, with or without adjustment.

Figure 6:
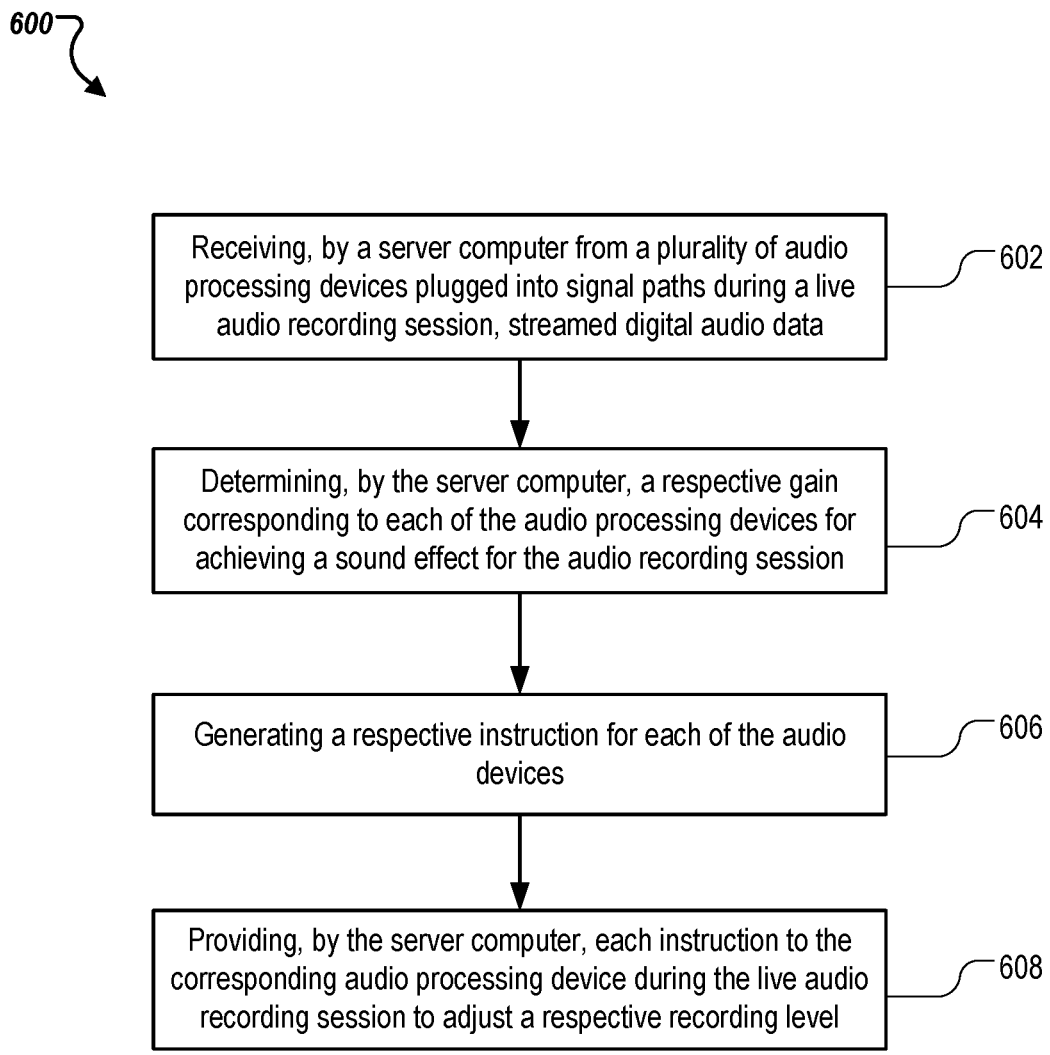
FIG. 6 is a flowchart of an example process of streaming control performed by a server.

FIG. 6 is a flowchart of an example process 600 of streaming control performed by a server. The server can include one or more computer processors, standing alone, built into an audio system, or in a cloud computing environment, that are programmed to perform the operations of the process 600. An example server is the server 402 of FIG. 4.

The server receives (602) streamed digital data from multiple audio processing devices plugged into signal paths and configured to record audio in an audio recording session. The digital data includes digitally encoded audio signals and metadata. Each signal path can include a respective audio processing device connecting an upstream device including a microphone or an instrument to a downstream device including a recorder or an amplifier. The audio recording session can be a live session, or a session in which one or more instruments play pre-recorded sounds, e.g., a laptop computer playing previously produced content.

The server determines (604) a respective gain corresponding to each of the audio processing devices for achieving a sound effect for the audio recording session based on the streamed digital data. Determining the respective gains can include balancing signal levels among the audio processing devices, emphasizing, in response to a user input, a lead performer corresponding to a given audio processing device, or both.

In some implementations, the server receives metadata from at least one audio processing device of the audio processing devices. The metadata can indicate one or more attributes of an upstream device or the audio processing device. Determining the respective gain for the particular audio processing device can include determining a gain that compensates for the one or more attributes of the upstream device or the particular audio processing device or for balancing the digital audio data among the devices.

The server generates (606) a respective instruction for each of the audio devices. Each instruction is operable to cause a corresponding audio processing device to adjust to the respective gain during recording. The instruction can include an identifier of a corresponding audio processing device and an operator such as increase gain, decrease gain, pause, blink, display certain information, or a combination of the above. The server can register the audio processing devices using a mobile device. The server can determine a respective identifier for each of the audio processing devices, for example, based on a user input on the mobile device.

The server provides (608) each instruction to the corresponding audio processing device during the audio recording session to adjust a respective recording level. Providing the instructions to the audio processing devices can occur simultaneously or individually for each device.

In some implementations, the server can determine, based on metadata associated with the streamed digital audio data, that a battery level of a particular audio processing device is below a threshold, e.g., below X volts or below Y percent left. The server generates a particular instruction for the particular audio processing device. The particular instruction can specify that a particular lossy compression scheme shall be used on the particular audio processing device to reduce power consumption. The particular lossy compression scheme can be a scheme that is different from a current compression scheme, in that the specified particular lossy compression scheme is a less bandwidth-optimized but also less computationally-intensive scheme. The server can provide that particular instruction to the particular device.

In some implementations, the server can determine, based on metadata associated with the streamed digital audio data, a battery level of one or more particular audio processing devices and a communication bandwidth between the one or more particular audio processing devices and the server computer. The server can determine a particular lossy compression scheme that balances needs to save battery and to minimize bandwidth consumption based on the battery level and the communication bandwidth. The particular lossy compression can be selected to optimize trade off of battery usage and bandwidth consumption. The server can generate particular instructions for one or more particular audio processing devices, the particular instruction specifying that the particular lossy compression scheme shall be used on the one or more particular audio processing devices. The server can provide that particular instruction to the one or more particular audio processing devices.

In some implementations, the server can detect an event, e.g., a pause in an incoming stream, that indicates a low-bandwidth condition, e.g., a network slowdown, between a particular audio processing device and the server. The server generates a particular instruction for the particular audio processing device. The particular instruction can specify that a lossy compression scheme shall be used on the particular audio processing device to reduce bitrate. The server can provide that particular instruction to the particular device.

In some implementations, the server can detect, based on digital audio data from a particular audio processing device, that a room sound level or a feedback level exceeds a threshold. In addition, the server can determine, based on metadata associated with the streamed digital audio data, that a microphone of the particular audio processing device is a multi-pattern microphone. The server can generate a particular instruction for the particular audio processing device. The particular instruction can specify that a polar pattern of the multi-pattern microphone shall change between two of an omnidirectional mode, a bidirectional mode, and a cardioid mode, e.g., from the omnidirectional mode to the cardioid mode, to reduce the room sound level or feedback level. The server can provide that particular instruction to the particular device.

Exemplary Recording Device Architecture

Figure 7:
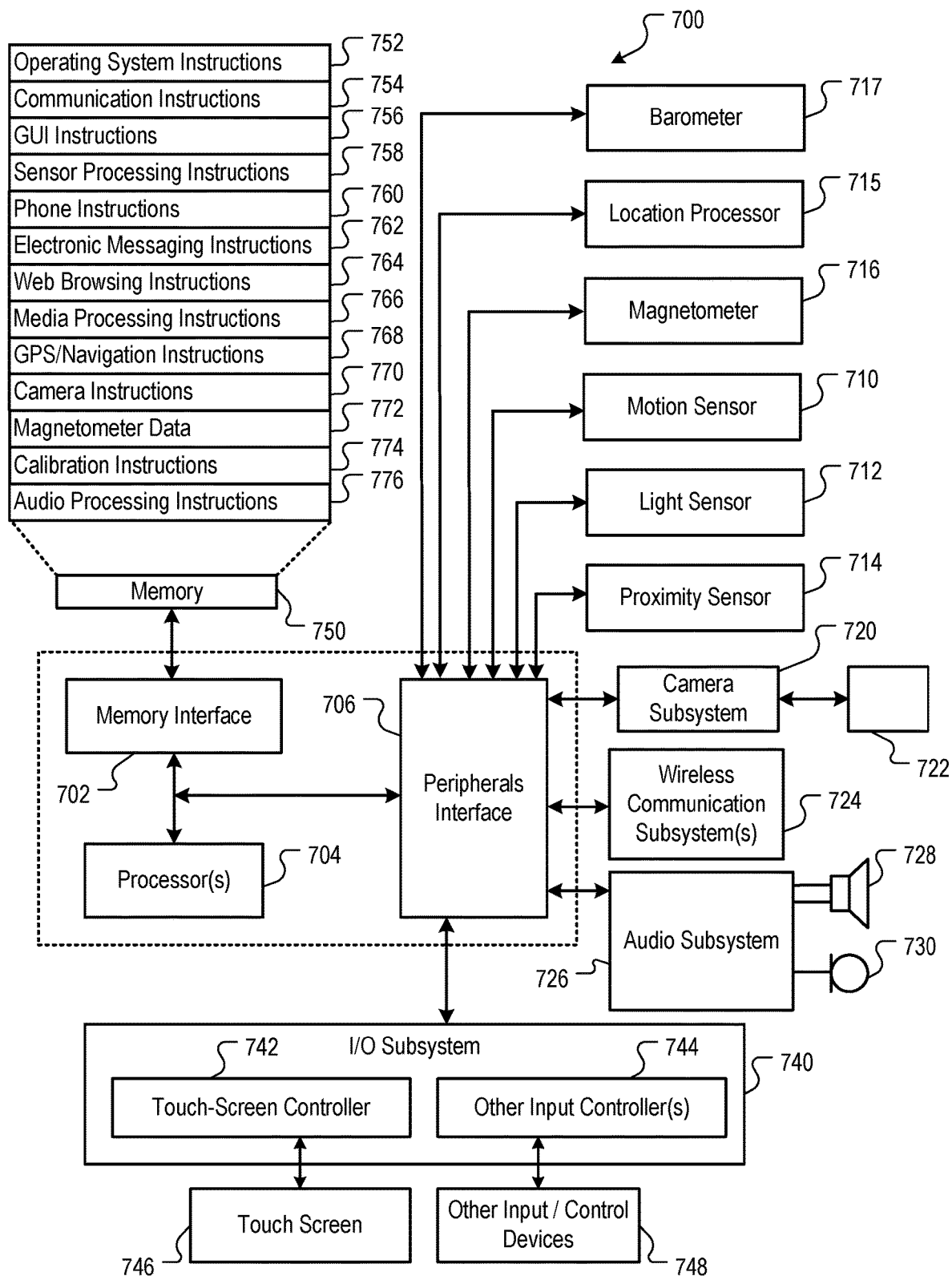
FIG. 7 is a block diagram illustrating an example device architecture of a mobile device implementing the features and operations described in reference to FIGS. 1-6.

FIG. 7 is a block diagram illustrating an exemplary device architecture 700 of a device implementing the features and operations described in reference to FIGS. 1-6. The device can be, for example, audio processing device 102 or 108 of FIG. 1 or the server 402 of FIG. 4. A device can include memory interface 702, one or more data processors, image processors and/or processors 704 and peripherals interface 706. Memory interface 702, one or more processors 704 and/or peripherals interface 706 can be separate components or can be integrated in one or more integrated circuits. Processors 704 can include application processors, baseband processors and wireless processors. The various components in the mobile device, for example, can be coupled by one or more communication buses or signal lines.

Sensors, devices and subsystems can be coupled to peripherals interface 706 to facilitate multiple functionalities. For example, motion sensor 710, light sensor 712 and proximity sensor 714 can be coupled to peripherals interface 706 to facilitate orientation, lighting and proximity functions of the mobile device. Location processor 715 can be connected to peripherals interface 706 to provide geopositioning. In some implementations, location processor 715 can be programmed to perform the operations of a GNSS receiver. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Motion sensor 710 can include one or more accelerometers configured to determine change of speed and direction of movement of the mobile device. Barometer 717 can include one or more devices connected to peripherals interface 706 and configured to measure pressure of atmosphere around the mobile device.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which a mobile device is intended to operate. For example, a mobile device can include communication subsystems 724 designed to operate over a GSM network, a GPRS network, an EDGE network, a Wi-Fi™ or WiMax™ network and a Bluetooth™ network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording and telephony functions. Audio subsystem 726 can be configured to receive voice commands from the user.

I/O subsystem 740 can include touch surface controller 742 and/or other input controller(s) 744. Touch surface controller 742 can be coupled to a touch surface 746 or pad. Touch surface 746 and touch surface controller 742 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 746 can include, for example, a touch screen.

Other input controller(s) 744 can be coupled to other input/control devices 748, such as one or more buttons, rocker switches, thumb-wheel, infrared port, USB port and/or a pointer device such as a stylus. The one or more buttons (not shown) can include an up/down button for volume control of speaker 728 and/or microphone 730.

In one implementation, a pressing of the button for a first duration may disengage a lock of the touch surface 746; and a pressing of the button for a second duration that is longer than the first duration may turn power to the mobile device on or off. The user may be able to customize a functionality of one or more of the buttons. The touch surface 746 can, for example, also be used to implement virtual or soft buttons and/or a keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 702 can be coupled to memory 750. Memory 750 can include high-speed random access memory and/or non-volatile memory, such as one or more magnetic disk storage devices, one or more optical storage devices and/or flash memory (e.g., NAND, NOR). Memory 750 can store operating system 752, such as iOS, Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Location instructions 768 to facilitate generic GNSS and location-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can store audio processing instructions 776 that, when executed by processor 704, can cause processor 704 to perform various operations including, for example, the operations of the audio processing device 102 of FIG. 1 or server 402 of FIG. 4.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Figure 8:
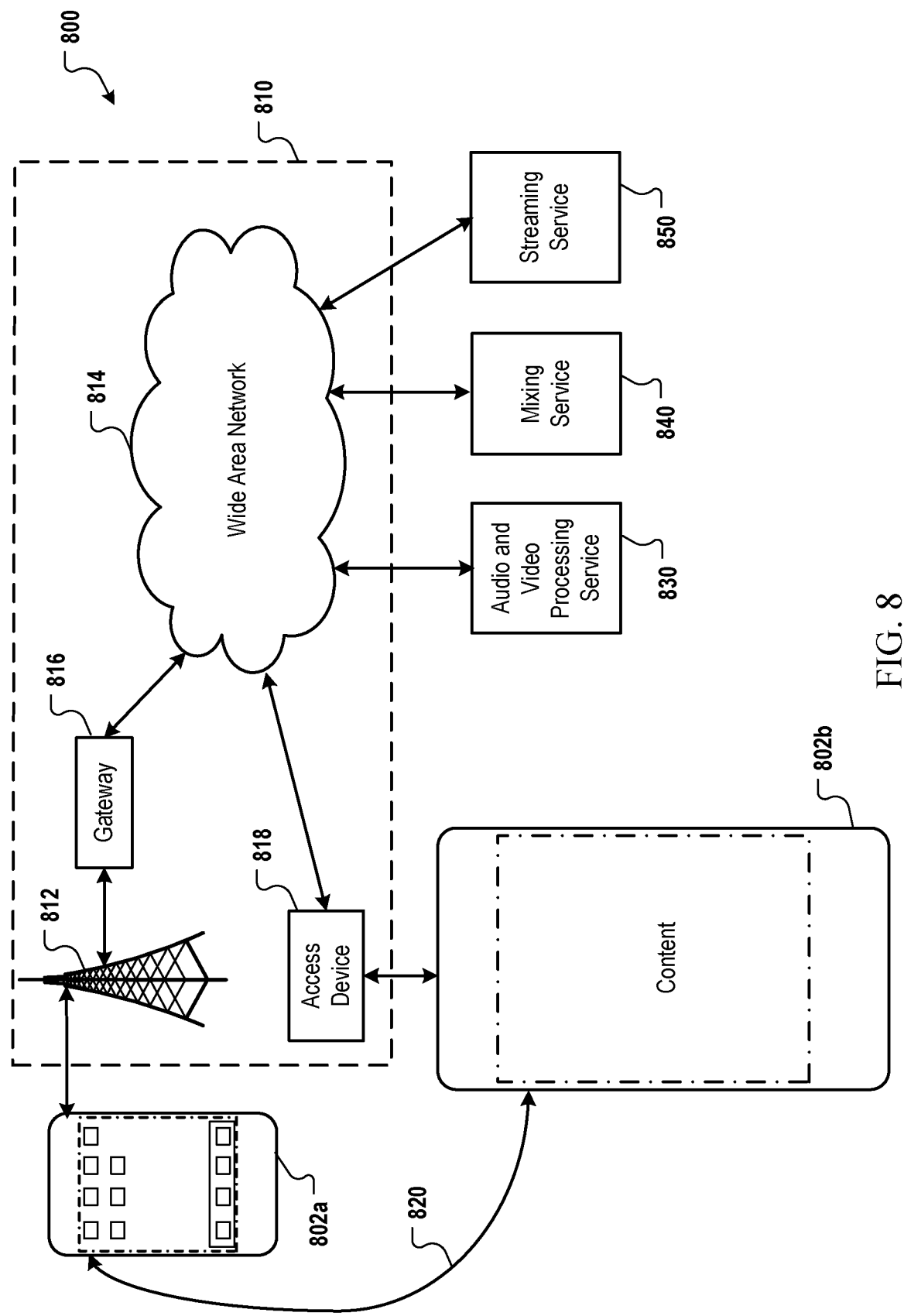
FIG. 8 is a block diagram of an example network operating environment for the devices in FIGS. 1-6.

FIG. 8 is a block diagram of an example network operating environment 800 for the devices of FIGS. 1-6. Devices 802*a* and 802*b* can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access point, can provide communication access to the wide area network 814. Each of devices 802*a* and 802*b* can be the audio processing device 102 or audio processing device 108 of FIG. 1, or the server 402 of FIG. 4.

In some implementations, both voice and data communications can be established over wireless network 812 and the access device 818. For example, device 802*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the device 802*b* can place and receive phone calls, send and receive e-mail messages, and retrieve electronic documents over the access device 818 and the wide area network 814. In some implementations, device 802*a* or 802*b* can be physically connected to the access device 818 using one or more cables and the access device 818 can be a personal computer. In this configuration, device 802*a* or 802*b* can be referred to as a "tethered" device.

Devices 802*a* and 802*b* can also establish communications by other means. For example, wireless device 802*a* can communicate with other wireless devices, e.g., other mobile devices, cell phones, etc., over the wireless network 812. Likewise, devices 802*a* and 802*b* can establish peer-to-peer communications 820, e.g., a personal area network, by use of one or more communication subsystems, such as the Bluetooth™ communication devices. Other communication protocols and topologies can also be implemented.

The device 802*a* or 802*b* can, for example, communicate with one or more services 830, 840 and 850 over the one or more wired and/or wireless networks. For example, one or more audio and video processing services 830 can provide services of audio processing including automatic gain adjustment and mixing as described above. Mixing service 840 can provide user interfaces that allow a mixing professional to log in through a remote console to perform post-recording mixing operations on audio data. Streaming service 850 can provide user interfaces that allow a user device to download or stream mixed audio data.

Device 802*a* or 802*b* can also access other data and content over the one or more wired and/or wireless networks. For example, content publishers, such as news sites, Really Simple Syndication (RSS) feeds, web sites, blogs, social networking sites, developer networks, etc., can be accessed by device 802*a* or 802*b*. Such access can be provided by invocation of a web browsing function or application (e.g., a browser) in response to a user touching, for example, a Web object.

Example System Architecture

Figure 9:
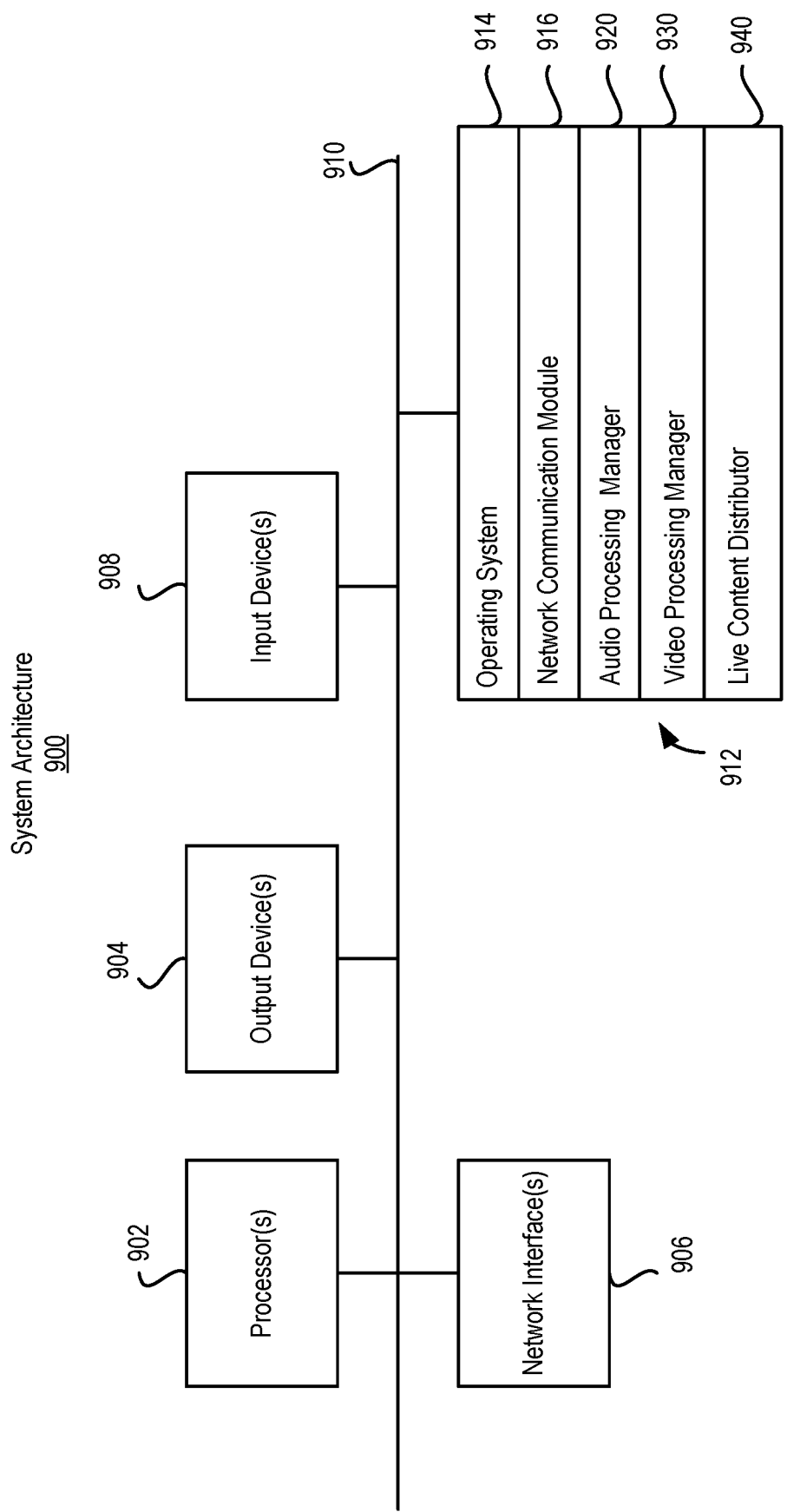
FIG. 9 is a block diagram of an example system architecture for an example computing device implementing the features and operations described in reference to FIGS. 1-6.

FIG. 9 is a block diagram of a system architecture for an example computing device implementing the features and operations described in reference to FIGS. 1-6. The computing device can be the audio processing device 102 of FIG. 1 or server 402 of FIG. 4. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to a medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., a Linux® operating system), network communication module 916, audio processing manager 920, video processing manager 930 and live content distributor 940. Operating system 914 can be multi-user, multiprocessing, multitasking, multithreading, real time, etc. Operating system 914 performs basic tasks, including but not limited to: recognizing input from and providing output to network interfaces 906 and/or devices 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.).

Audio processing manager 920 can include computer instructions that, when executed, cause processor 902 to perform various audio processing operations as described above, e.g., in reference to server 402. Video processing manager 930 can include computer instructions that, when executed, cause processor 902 to perform video editing and manipulation operations. Live content distributor 940 can include computer instructions that, when executed, cause processor 902 to perform operations of streaming processed live audio data to one or more user devices.

Architecture 900 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

Various aspects of the present invention may be appreciated from the following enumerated example embodiments (EEEs):

A method comprising:
  intercepting, by an audio processing device, an audio signal transmitted from an upstream device in an audio signal path;
  encoding, by the audio processing device, the audio signal into digital data;
  streaming, by the audio processing device, the digital data to a server computer;
  receiving, by the audio processing device from the server computer, one or more instructions on modifying a state of the audio processing device; and
  modifying the state of the audio processing device according to the one or more instructions; and
  providing, to a downstream device in the audio signal path, a representation of the audio signal.

1. The method of EEE 1, wherein the representation of the audio signal includes a pass through of the audio signal.

2. The method of EEE 1, comprising:
  determining, by the audio processing device, that the instruction includes an instruction to adjust an aspect of the audio signal; and
  in response to the determining, adjusting the aspect of the audio signal, wherein the representation of the audio signal incudes the adjusted audio signal.

3. The method of EEE 3, wherein the upstream device includes a microphone, a computer, or an instrument wired to the audio processing device, the downstream device includes an audio recorder or an amplifier, and the audio signal is an analog signal or a digital audio signal.

4. The method of EEE 4, wherein the aspect of the audio signal is a signal gain, the signal gain includes at least one of a gain of a digital encoder of the audio processing device or a post-encoding digital gain after the audio signal has been encoded by the digital encoder.

5. The method of EEE 1, wherein:
  the audio signal includes a digital audio signal, and
  encoding the audio signal into digital data is performed using a lossy encoding scheme.

6. The method of EEE 1, wherein encoding the audio signal into digital data comprises performing joint lossy codec optimization on a plurality of channels of the audio signal.

7. The method of EEE 1, wherein the audio processing device is one of a plurality of audio processing devices, each of the audio processing devices registered at the server computer.

8. The method of EEE 8, wherein registering the audio processing device is through a discovery process, and the audio processing device is configured automatically.

9. The method of EEE 1, comprising providing feedback information for display on the audio processing device, the feedback information indicating that the audio processing device is designated as a selected device at the server computer.

10. The method of EEE 1, comprising providing device information by the audio processing device to the server computer, the device information including at least one of:
  a memory amount indicating amount of memory available for recording;
  a battery status; or
  device type metadata indicating attributes of the audio processing device.

11. The method of EEE 1, comprising:
  receiving, by the audio processing device from the server computer, streamed audio signals, the streamed audio signals include a representation of the digital data provided by the server computer; and
  providing the streamed audio signals to a monitor device.

12. The method of EEE 12, wherein the streamed audio signals include a mix of the representation of the digital data and digital data submitted to the server computer by another audio processing device.

13. A method, comprising:
receiving, by a server computer from a plurality of audio processing devices plugged into signal paths and configured to record audio in an audio recording session, streamed digital audio data;
determining, by the server computer based on the streamed digital audio data, a respective gain corresponding to each of the audio processing devices for achieving a sound effect for the audio recording session;
generating a respective instruction for each of the audio devices, each instruction operable to cause a corresponding audio processing device to adjust to the respective gain during recording; and
providing, by the server computer, each instruction to the corresponding audio processing device during the audio recording session to adjust a respective recording level.

14. The method of EEE 14, wherein each signal path includes a respective audio processing device connecting an upstream device including a microphone or an instrument to a downstream device including a recorder or an amplifier.

15. The method of EEE 14, wherein determining the respective gain corresponding to each of the audio processing devices comprises at least one of balancing signal levels among the audio processing devices or emphasizing, in response to a user input, a lead performer corresponding to a given audio processing device.

16. The method of EEE 14, comprising receiving, by the server computer from an audio processing device of the audio processing devices, metadata indicating one or more attributes of an upstream device, wherein determining the respective gain for the audio processing device comprises determining a gain that compensates for the one or more attributes of the upstream device.

17. The method of EEE 14, comprising:
determining, by the server computer based on metadata associated with the streamed digital audio data, a battery level of a particular audio processing device and a communication bandwidth between the particular audio processing device and the server computer;
determining a particular lossy compression scheme that balances needs to save battery and to minimize bandwidth consumption based on the battery level and the communication bandwidth;
generating a particular instruction for the particular audio processing device, the particular instruction specifying that the particular lossy compression scheme shall be used on the particular audio processing device; and
providing that particular instruction to the particular audio processing device.

18. The method of EEE 14, comprising:
detecting, by the server computer based on digital audio data from a particular audio processing device, that a room sound level or a feedback level exceeds a threshold;
determining, by the server computer based on metadata associated with the streamed digital audio data, that a microphone of the particular audio processing device is a multi-pattern microphone;
generating a particular instruction for the particular audio processing device, the particular instruction specifying that a polar pattern of the multi-pattern microphone shall change between two of an omnidirectional mode, a bidirectional mode, and a cardioid mode; and
providing that particular instruction to the particular audio processing device.

19. The method of EEE 14, comprising:
registering the audio processing devices at the server computer using a mobile device; and
determining a respective identifier for each of the audio processing devices.

20. The method of EEE 20, comprising:
providing for display a list of the identifiers of the registered audio processing devices;
receiving a user selection of a particular audio processing device from the list; and
providing an instruction for generating a light signal or sound signal to the selected audio processing device, the light signal or sound signal operable to indicate the user selection.

21. A system comprising:
one or more processors; and
a non-transitory computer-readable medium storing instructions that, when executed by the one or more processors, cause the one or more processors to perform operations comprising operations of any one of EEEs 1 to 21.

22. A non-transitory computer-readable medium storing instructions that, when executed by one or more processors, cause the one or more processors to perform operations comprising operations of any one of EEEs 1 to 21.

What is claimed is:
1. A method comprising:
intercepting, by a first audio processing device coupled to a first upstream device, a first audio signal transmitted from the first upstream device in an audio signal path;
intercepting, by a second audio processing device coupled to a second upstream device, a second audio signal transmitted from the second upstream device in the audio signal path;
encoding, by the first or second audio processing device, the first or second audio signal into digital data, the digital data comprising digitally encoded audio signals and device type metadata indicating one or more attributes of the first or second upstream device, where at least one attribute indicates that a microphone of the first or second audio processing device is a multi-pattern microphone;
streaming, by the first or second audio processing device, the digital data to a server computer;
receiving, by at least one of the first or second audio processing devices from the server computer, one or more instructions for modifying a gain of at least one of the first or second audio processing devices and for changing a pattern of the multi-pattern microphone;
modifying the gain of the first or second audio processing device according to the one or more instructions, thereby adjusting a signal gain of the first or second audio signal according to the modified gain; and
providing, to a downstream device in the audio signal path, the adjusted first or second audio signal.

2. The method of claim 1, wherein the first or second upstream device includes a microphone, a computer, or an instrument wired to the first or second audio processing device, the downstream device includes an audio recorder or an amplifier, and the first or second audio signal is an analog signal or a digital audio signal.

3. The method of claim 1, wherein the gain to be modified includes at least one of a gain of a digital encoder of the first or second audio processing device or a post-encoding digital gain after the first or second audio signal has been encoded by the digital encoder.

4. The method of claim 1, wherein encoding the first or second audio signal into digital data comprises performing joint lossy codec optimization on a plurality of channels of the first or second audio signal.

5. The method of claim 1, comprising:
receiving, by the first or second audio processing device from the server computer, streamed audio signals, the streamed audio signals include a representation of the digital data provided by the server computer; and
providing the streamed audio signals to a monitor device.

6. A method, comprising:
receiving, by a server computer from a plurality of audio processing devices plugged into signal paths and configured to record audio in an audio recording session, streamed digital audio data, the streamed digital audio data comprising digitally encoded audio signals;
receiving, by the server computer from an audio processing device of the audio processing devices, device type metadata indicating one or more attributes of an upstream device,
determining, by the server computer based on the streamed digital audio data, a respective gain corresponding to each of the audio processing devices for achieving a sound effect for the audio recording session;
detecting, by the server computer based on the digital audio data, that a room sound level or a feedback level exceeds a threshold;
determining, by the server computer based on the device type metadata, that a microphone of a particular audio processing device is a multi-pattern microphone;
generating a particular instruction for the particular audio processing device, the particular instruction specifying a pattern for the multi-pattern microphone; and
providing that particular instruction to the particular audio processing device;
generating a respective instruction for each of the audio devices, each instruction operable to cause a corresponding audio processing device to adjust to the modified respective gain during recording; and
providing, by the server computer, each instruction to the corresponding audio processing device during the audio recording session to adjust a respective recording level.

7. The method of claim 6, comprising:
determining, by the server computer based on device type metadata associated with the streamed digital audio data, a battery level of a particular audio processing device and a communication bandwidth between the particular audio processing device and the server computer;
determining a particular lossy compression scheme that balances needs to save battery and to minimize bandwidth consumption based on the battery level and the communication bandwidth;
generating a particular instruction for the particular audio processing device, the particular instruction specifying that the particular lossy compression scheme shall be used on the particular audio processing device; and
providing that particular instruction to the particular audio processing device.

8. The method of claim 6,
wherein the particular instruction specifies that a polar pattern of the multi-pattern microphone shall change between two of an omnidirectional mode, a bidirectional mode, and a cardioid mode.

9. The method of claim 6, comprising:
registering the audio processing devices at the server computer using a mobile device; and
determining a respective identifier for each of the audio processing devices.

10. The method of claim 9, comprising:
providing for display a list of the identifiers of the registered audio processing devices;
receiving a user selection of a particular audio processing device from the list; and
providing an instruction for generating a light signal or sound signal to the selected audio processing device, the light signal or sound signal operable to indicate the user selection.

11. A system comprising:
one or more processors; and
a non-transitory computer-readable medium storing instructions that, when executed by the one or more processors, cause the one or more processors to perform operations comprising operations of claim 1.

12. A non-transitory computer-readable medium storing instructions that, when executed by one or more processors, cause the one or more processors to perform operations comprising operations of claim 1.

* * * * *